June 27, 1967 S. MOSKOWITZ ET AL 3,327,539
INERTIAL REFERENCE PLATFORM
Filed May 3, 1963 2 Sheets-Sheet 1
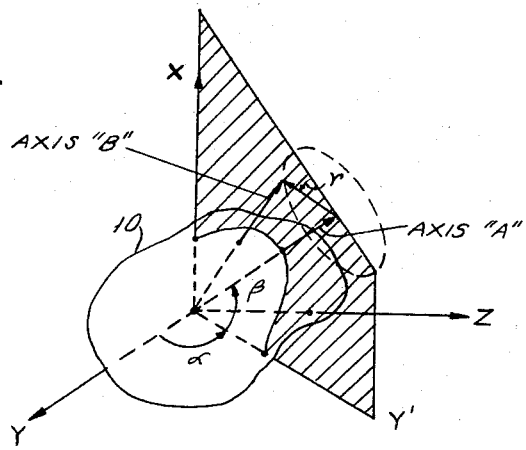
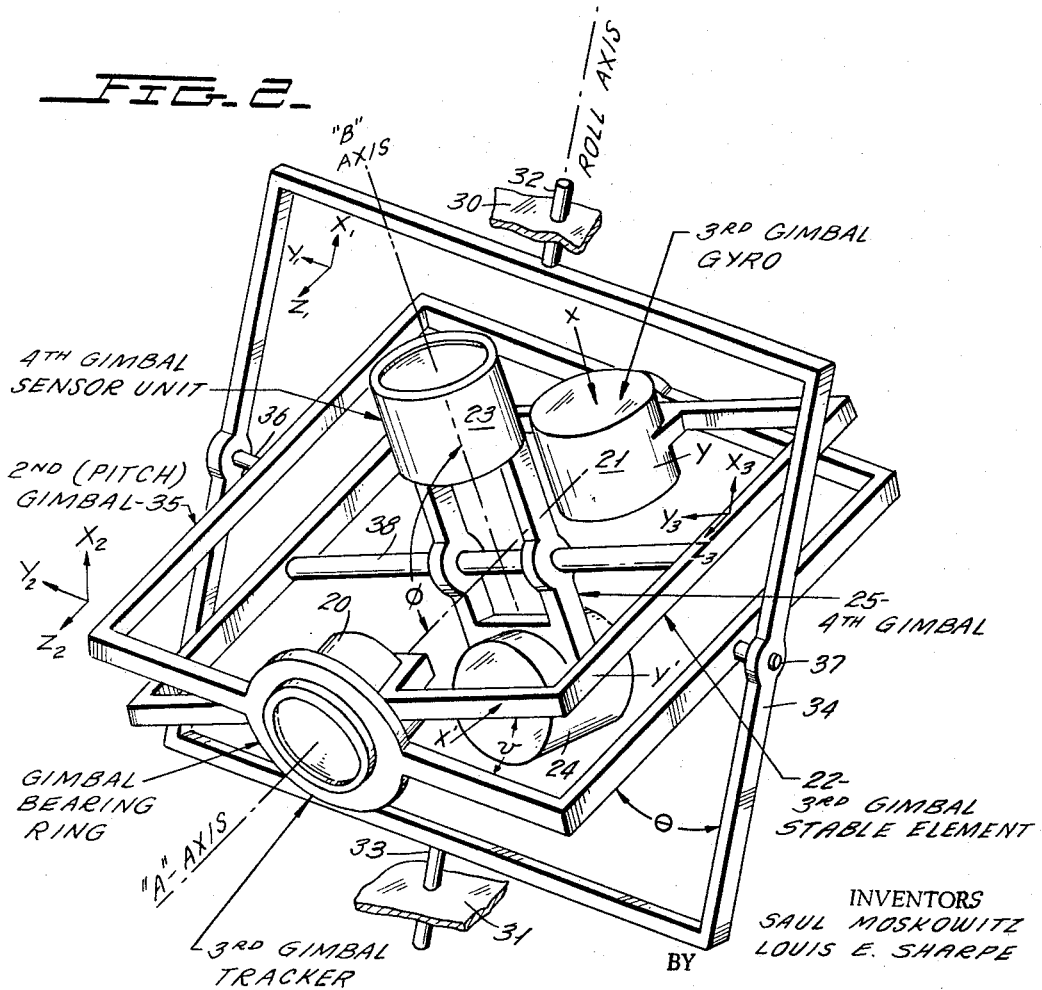
INVENTORS
SAUL MOSKOWITZ
LOUIS E. SHARPE
BY
OSTROLENK, FABER, GERB & SOFFEN
ATTORNEYS

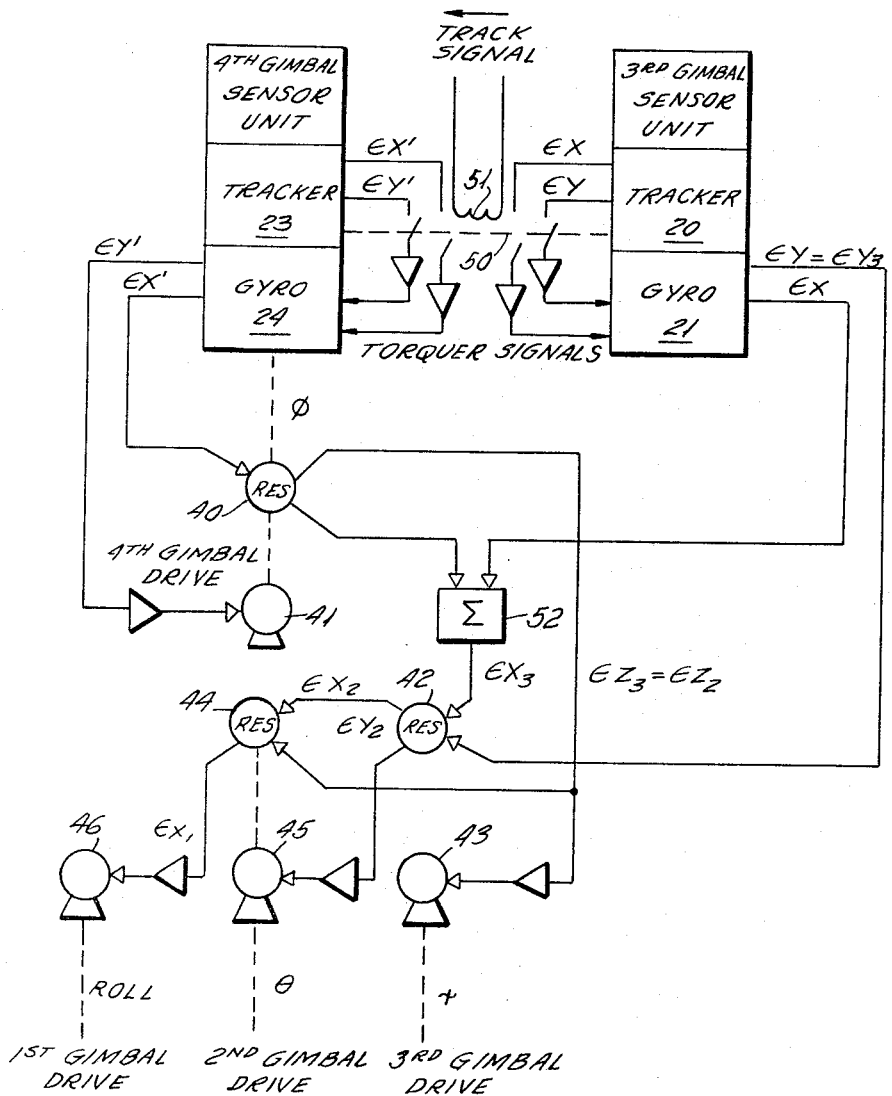

United States Patent Office 3,327,539
Patented June 27, 1967

3,327,539
INERTIAL REFERENCE PLATFORM
Saul Moskowitz, Flushing, and Louis E. Sharpe, Malverne, N.Y., assignors to Kollsman Instrument Corporation, Elmhurst, N.Y., a corporation of New York
Filed May 3, 1963, Ser. No. 277,939
2 Claims. (Cl. 74—5.34)

This invention relates to a platform stabilizing structure and more specifically relates to the use of a pair of bi-axial inertial reference devices for the complete stabilization of a platform.

In both earth-constrained and space vehicles a platform is provided for inertial measuring instruments such as accelerometers used in the navigation and guidance of the vehicles. The present invention recognizes that complete platform stabilization can be obtained by a first and second bi-axial inertial reference element. Moreover, two redundant pairs of such elements are provided such as a first and second two-degrees-of-freedom gyroscopes and a first and second bi-axial star tracker with the gyroscopes and trackers being mounted in a functionally symmetrical arrangement.

That is to say, the first and second tracker optical axes are collinear with the first and second gyro-spin axes respectively. Accordingly, stabilization can be obtained by the output of either the two trackers or two gyroscopes.

Accordingly, a primary object of this invention is to provide a stable platform on an earth-constrained or space vehicle.

Another object of this invention is to provide a stable platform which is extremely accurate in attitude.

A further object of this invention is to provide a stabilized platform which eliminates the need for angular transducers for readout which degrades accuracy.

Another object of this invention is to provide a novel platform stabilizing system which provides drift free operation over extended periods of time.

Yet another object of this invention is to provide a platform stabilizing system wherein platform orientation will be known to star tracker pointing accuracy without need for measurement or readout.

A further object of this invention is to provide a stabilized platform wherein gyroscopes are incorporated in the tracker error loop to allow optimum use of band passes of both trackers and gyroscopes.

Another object of this invention is to provide a stabilized platform which has a duality of stabilizing elements to provide high reliability.

These and other objects of this invention will become more apparent from the following description when taken in connection with the drawings, in which:

FIG. 1 shows a set of fixed reference coordinates having a rigid body with two axes therein for use in explaining the basic concept of the invention.

FIG. 2 schematically illustrates in perspective view, the gimbaled suspension of two stellar-inertial units in accordance with the invention.

FIG. 3 schematically illustrates a block diagram of the control circuitry and motors for the stabilization of the structure of FIG. 2.

The stellar derived, gyroscopically aided inertial reference platform described herein is realized in its optimum configuration because of the functional identity between the celestial tracker and the two-degree-of-freedom gyroscope. Both are two axis stabilizers and, therefore, can be mounted in a functionally symmetrical arrangement, i.e., with the tracker optical axes and the gyro spin axes collinear.

Within the validity of the axioms of classical mechanics, the stellar background provides a constant inertial reference. The stellar-inertial platform may consequently be inertially stabilized by the trackers or the gyroscopes. During periods of midcourse trajectory correction and terminal guidance (space flight applications) the coordinate frame derived from the tracker configuration serves as a basis for initial alignment of the gyroscopic reference. The gyroscopes then serve as the short-term attitude reference, until operational conditions permit reacquisition of the reference stars or until completion of a retro-thrust operation, or the like.

For use with a mobile launched ballistic missile the system offers unique advantages over other approaches to platform stabilization. Thus, critical alignment is not necessary prior to launch because of the error convergent characteristics of the system. The platform is aligned prior to launch so that when atmospheric and trajectory constraints permit the acquisition of stars the trackers are pointing in their appropriate directions. The platform is gyroscopically stabilized prior to acquisition. Upon star acquisition the trackers are used to provide the stabilization error signals.

An important feature of the invention is that it eliminates utilization of angular transducers for the transformation of stabilized accelerometer outputs into a particular reference or computing frame. The connection (transformation) between the stellar-inertial reference space defined by a particular pair of stars and the computational space as dictated by the particular navigation or guidance problem is known and may be precomputed to any desired order of accuracy.

The novel stellar-inertial stabilization scheme develops from an application of Euler's Theorem that most general displacement of a rigid body with a fixed point is equivalent to a rotation about a line through that point. It can be demonstrated from this theorem that a pair of bi-axial inertial references may be employed for complete stabilization of a rigid body. As illustrated in FIG. 1, X, Y and Z represent an external fixed set of reference axes and A and B represent a pair of axes fixed in a rigid body 10. (A perpendicular to the plane defined by axes A and B provides the third body-fixed axis.)

Consider axis A which is specified relative to the reference coordinate system in terms of angles $\alpha$ and $\beta$. Specification of the total body orientation is completed in terms of $\gamma$, the angular rotation of axis B about axis A. For the problem under consideration the angle between A and B is determined by the stars employed for stabilization.

For a valid application of Euler's Theorem, it is necessary that the reference (fixed body) point of rotation also be fixed relative to the refrence space. In reality, this point (representing a vehicle) moves along the orbit of the vehicle. On a local basis, this point is not fixed. The stellar background, however, lies at a very great distance compared with the dimensions of the inner solar system (effectively infinite) from any vehicle trajectory. Consequently, negligible parallax errors are incurred in sighting any reference star. The location of the navigation unit may, therefore, be considered fixed relative to the given attitude reference (the stellar background).

In accordance with the invention, the above noted stabilization shown is implemented by the gimbaled suspension of two stellar-inertial units. Thus, as shown in FIG. 2, the first sensor unit comprises a star tracker 20 and a two-degrees-of-freedom gyroscope 21 which are each mounted on gimbal 22 in balanced relation. Both the star tracker and gyroscope are of types well known to those skilled in the art.

Gimbal 22 is the stabilized member of the system as will be seen more fully hereinafter. Thus, a triad of accelerometers may be mounted on gimbal 22 to provide the desired information for control or the like. For purposes of simplicity, the accelerometers are represented by the triad of coordinate axes $X_3$, $Y_3$, and $Z_3$ rather than by a set of three one-axis accelerometer canisters or the equivalent thereof.

The second sensor unit is comprised of star tracker 23 and gyroscope 24 carried on gimbal 25 and is identical to tracker 20 and gyroscope 21 respectively.

The optical axis of tracker 20 and gyrospin axis of gyroscope 21 are collinear and define axis A of FIG. 1. The optical axis of tracker 23 and gyrospin axis of gyroscope 24 are similarly co-linear and define axis B of FIG. 1.

The complete suspension system of FIG. 2 is pivotally connected to the vehicle fragmentarily shown at sections 30 and 31 by pins 32 and 33 of first gimbal 34. Thus, gimbal 34 may be arranged to rotate about the roll axis of the vehicle. A second gimbal 35 is pivotally connected to gimbal 34 by means of pins 36 and 37 and rotates about the pitch axis of the vehicle.

The third gimbal is the previously described stable element 22 which is pivotally mounted on gimbal 35 as shown, while the fourth gimbal 25 is pivotally carried by rod 38 of gimbal 22.

Each of the gimbal axes of gimbals 34, 35, 22 and 25 have connected thereto appropriate drive motors (or a direct torquer) and resolvers necessary for stabilization and control. These are not shown in FIG. 2 for simplicity and are well known to those skilled in the art. Thus, for platform stabilization, appropriate resolvers are provided for the $\phi$, $\psi$, and $\theta$ axes. The number of resolvers required for control and initial alignment purposes is determined by the choice of guidance and control system.

The arrangement of resolvers and drive motors is schematically shown in FIG. 3 along with the manner in which they are electrically connected to one another. Thus, the sensor unit of gimbal 25 which includes tracker 23 and gyroscope 24 is operatively connected to a resolver 40 and drive motor 41 as schematically indicated by the dotted lines. Operation of motor 41 will therefore rotate gimbal 25 about the $\phi$ axis.

The sensor unit on the third gimbal 22 comprised of tracker 20 and gyroscope 21 is operatively connected to resolver 42 and drive motor 43 which drives gimbal 22 about the $\psi$ axis.

The second gimbal 35 is connected to resolver 44 and drive motor 45 which drives gimbal 35 about the $\theta$ axis. Finally, gimbal 34 is connected to the first gimbal drive motor 46 which drives gimbal 34 about the roll axis.

Prior to star acquisition, control switching means 50, which is under the control of energizable coil 51, is open so that the error signals transmitted are due solely to the gyroscopes. After star acquisition, coil 51 is energized in any desired manner to close switches 50 whereby the tracker error signals are used as torquer signals for their respective gyroscopes. These signals then cause the gyroscopes to precess as if an actual displacement has been experienced.

Regardless of which mode of operation is in progress, the third gimbal sensor unit will deliver error signals in both X and Y directions, indicated as $\epsilon X$ and $\epsilon Y$. Equivalent error signals from the fourth gimbal sensor unit are similarly shown, but with primed letters.

In operation, and prior to star acquisition, or during periods of star observation, the gyroscopes provide stabilization in a conventional manner although, of course, the gimbal configuration is not conventional. One error signal $\epsilon Y'$ from the fourth gimbal gyro 24, the Y' axis signal, is used as a drive signal for the $\phi$ axis drive motor or torquer 41. The other error signal $\epsilon X'$, and X' axis signal, is transformed by means of the resolver 40 on the shaft into the summing network 52. There the component $\epsilon X$ in the $X_3$ direction is combined with the X axis error signal of the third gimbal gyro 21 to yield the $\epsilon X_3$ error signal. The Y axis error signal $\epsilon Y$ of gyro 21 is the $\epsilon Y_3$ error signal. The other component of $\epsilon X'$, the fourth gimbal gyro error signal, $\epsilon Z_3$, is used as the drive signal for the $\psi$ axis drive motor or torquer 43. The $\epsilon X_3$ and $\epsilon Y_3$ signals are transformed by means of the resolver 42 mounted on the $\psi$ axis shaft into the coordinate frame of the second gimbal 35. Here the $\epsilon Y_2$ signal is used as the drive signal for the $\theta$ axis drive motor or torquer 45. The $\epsilon X_2$ and the $\epsilon Z_2$ signals must be transformed into the first gimbal coordinate frame to provide $\epsilon X_1$, the drive signal for the outermost or roll axis.

After star acquisition the track signal closes the track signal relays so that the tracker error signals may be used as torquer signals for their respective gyroscopes. These signals then cause the gyros to precess as if an actual displacement has been experienced. The pickoff signals from the gyros are then used in the manner described above.

Although preferred embodiments of the novel invention have been described, many variations and modifications will now be apparent to those skilled in the art, and it is preferred therefore to be limited not by the specific disclosure herein but only by the appended claims.

The embodiments of the invention in which an exclusive privilege or property is claimed are defined as follows:

1. A stabilized platform comprising a gimbal suspension system having first, second, third and fourth sequentially connected gimbals; each of said first, second, third and fourth gimbals having driving means connected thereto; each of said third and fourth gimbals having first and second sensor units mounted thereon; said first and second sensor units generating error signals responsive to a change in the position of the axes thereof in a first and second direction; said error signals being connected to said driving means to maintain at least one of said gimbals in a constant attitude; said first sensor units comprising star trackers; said second sensor units comprising gyroscopes.

2. The device substantially as set forth in claim 1 wherein the gyrospin axes of each of said gyroscopes are co-linear with the optical axis of its respective star tracker.

References Cited

UNITED STATES PATENTS

| | | | |
|---|---|---|---|
| 2,802,364 | 8/1957 | Gievers | 74—5.2 |
| 2,883,863 | 4/1959 | Karsten et al. | 74—5.22 |
| 2,972,892 | 2/1961 | Tiffany | 74—5.37 |
| 3,048,352 | 8/1962 | Hansen | 74—5.34 |

FRED C. MATTERN, Jr., *Primary Examiner.*

MILTON KAUFMAN, *Examiner.*

T. W. SHEAR, *Assistant Examiner.*